(12) United States Patent
Johnson

(10) Patent No.: US 6,431,931 B2
(45) Date of Patent: Aug. 13, 2002

(54) REVERSIBLE WEIGHTED FLOAT

(76) Inventor: Dale Johnson, 4141 N. Victoria, Shoreview, MN (US) 55126

( * ) Notice: Subject to any disclaimer, the term of this patent is extended or adjusted under 35 U.S.C. 154(b) by 0 days.

(21) Appl. No.: 09/886,506

(22) Filed: Jun. 21, 2001

Related U.S. Application Data

(60) Provisional application No. 60/213,108, filed on Jun. 21, 2000.

(51) Int. Cl.$^7$ ................................................. B63B 22/16
(52) U.S. Cl. .................................. 441/6; 441/1; 441/26
(58) Field of Search ................................ 441/1, 2, 6, 23, 441/24, 26; 43/43.1, 43.11, 43.12, 42.22, 42.23, 42.35, 42.39, 44.91, 44.95

(56) References Cited

U.S. PATENT DOCUMENTS

| | | | | |
|---|---|---|---|---|
| 2,493,971 A | * | 1/1950 | Johnson | 43/44.91 |
| 2,509,704 A | * | 5/1950 | Streitwieser | 43/43.12 |
| 2,531,806 A | * | 11/1950 | Coughlin | 43/44.91 |
| 2,591,332 A | * | 4/1952 | Behensky | 43/44.88 |
| 2,763,088 A | * | 9/1956 | Cowsert | 43/43.14 |
| 2,803,917 A | * | 8/1957 | Kimbrough | 43/44.87 |
| 3,037,217 A | * | 6/1962 | Mandra | 441/20 |
| 3,760,527 A | * | 9/1973 | Hamren | 43/44.88 |
| 3,766,680 A | * | 10/1973 | Torme et al. | 43/16 |
| 3,829,919 A | * | 8/1974 | Mathae | 441/28 |
| 4,139,960 A | | 2/1979 | Chojnowski | 43/15 |
| 4,357,775 A | | 11/1982 | Click | 43/43.1 |
| 4,748,764 A | | 6/1988 | Hammons | 43/43.1 |
| 5,273,468 A | * | 12/1993 | Nichols | 441/6 |
| 5,347,745 A | * | 9/1994 | Authement | 43/44.91 |
| 5,398,440 A | | 3/1995 | Amundson | 43/44.9 |
| 6,009,659 A | * | 1/2000 | Shannon et al. | 43/44.91 |

OTHER PUBLICATIONS

Greg Bohn, "Weeds 'n Walleyes . . ." Secrets of a Northwoods Walleye Guide—vol. 3, 1990, p. 48–52.
Mike McCelland, Walleye In Shallow Water, 1991, pp. 17–42.
Al Lindner, et al., Walleye Wisdom an In–Fisherman Handbook of Strategies, 1983, pp. 111–114.
Al Lindner, et al., Ice Fishing Secrets, 1991, pp. 113–126.
King Tutt, Mille Lacs Walleye Whiffer Lake Map, 1994.
Dick Sternberg, Fishing with Live Bait, 1982, pp. 10–11, 39, 42, and 70.

* cited by examiner

*Primary Examiner*—S. Joseph Morano
*Assistant Examiner*—Ajay Vasudeva
(74) *Attorney, Agent, or Firm*—Kinney & Lange, P.A.

(57) ABSTRACT

A reversible, weighted float, useful as a fishing bobber or marker buoy, comprises a buoyant sphere with first and second connectors fixedly attached on either end of its polar axis. The first and second connectors having eyelets at the distal ends thereof for securing an attachment line thereto. First and second cylindrical caps are releasably engageable with the first and second connectors, whereby the cylindrical caps substantially enclose the first and second connectors. Weight is selectively placed in either one of the cylindrical caps causing the sphere to stand in an upright position with the cylindrical caps in perpendicular alignment to the surface of water, independent of size and any attachments.

26 Claims, 11 Drawing Sheets

REVERSIBLE WEIGHTED FLOAT

The application claims priority from U.S. Provisional Application Ser. No. 60/213,108 filed Jun. 21, 2000 for "Reversible Weighted Float" by Dale Johnson.

BACKGROUND OF THE INVENTION

This invention relates to a floatation device for use as a fishing bobber or as a marking buoy, and more particularly to a floatation device which is reversibly weighted, whereby either of the two halves of the floatation device is selectively held upright in water.

A "bobber" is a float that is attached to fishing line between the pole and the weight near the distal end of the line. The bobber usually must be placed a predetermined distance behind the weight so that the weight and therefore the hook will dangle a desired distance below the surface of the water. Another function of a bobber is to alert the fisherman that a fish is nibbling at the bait or lure. Tugs by the fish on the line causes the bobber to dip in the water. Upon release of a tug, the buoyancy of the bobber causes it to rise in the water.

Fisherman, divers, recreational boaters, coast guards, and others mark a location of interest on a body of water with a marker buoy so that the location can be maintained or found easily at a later date. In other cases, a marker buoy is needed to mark the location of shallow water or a dangerous area. In either event, it is desirable that the location be marked with a floating visible buoy which is easily visible, anchored securely in one place, is not subject to drift as a result of wind and wave action, and that is lightweight, reliable, and reusable.

Inventions relating to buoys and fishing bobbers are well known. For example, U.S. Pat. No. 4,139,960 to Chojnowski discloses a fishing bobber which lays down while waiting for a fish to strike and which pivots uprights to indicate a fish is on the line. U.S. Pat. No. 4,357,775 to Click has an off-center weighted base to hold the bobber in one position and can be pivoted to a second position when a fish takes the bait. U.S. Pat. No. 4,748,764 to Hammons, discloses a fishing accessory having a buoyant weighted upper body with a blade and a lower submerged body with a line and hook attached. Pulling on the fishing line results in jiggling of the hook. In U.S. Pat. No. 5,398,440 to Amundsen, a fishing bobber having a buoyant body with a hydrodynamic body and a central hollow shaft through which a fishing line is passed is disclosed. These prior art patents disclose conventional fishing bobbers which rely on the weight of bait, tackle and sinkers to maintain an upright position. While this method functions reasonably well, it restricts the size of the bobber relative to the size of the fish sought and fails to maintain an upright position independent of the depth of the water. None of the these prior art patents provide a reversible, weighted float device for fishing, which allows for easily changeable, multiple and reversible color combinations between the halves of the bobber and also further functions as a marker or mooring buoy by attaching a weighted line or anchor.

BRIEF SUMMARY OF THE INVENTION

A reversibly weighted ball for floating in water comprising a first hemispherical shell having an inner surface defining a cavity, an outer surface and a first hole extending from the inner surface to the outer surface along a polar axis. The outer surface has a substantially flat first region centered around the first hole. A second hemispherical shell has an inner surface defining a cavity, an outer surface and a second hole extending from the inner surface to the outer surface along the polar axis. The outer surface of the second hemispherical shell has a substantially flat second region centered around the second hole. The first hemispherical shell is engageable with the second hemispherical shell to form a buoyant sphere. A first connector has a substantially flat base portion with a first and second surface and a elongate member, which extends from the first surface. The elongate member has an inner cavity and an eyelet on the distal end of the elongate member, whereby the eyelet provides access to the inner cavity. The base portion has a plurality of protrusions extending from the second surface for insertion into the first region of the first hemispherical shell. The protrusions allow the second surface of the base portion to contact the first region and prevent angular rotation of the first connector relative to the first hemispherical shell. The second surface of the base portion has an opening to the inner cavity of the elongate member. The base portion opening is aligned with the first hole of the first hemispherical shell when the first connector is fixedly attached to the first region. A second connector is substantially similar to the first connector and is fixedly attached to the second region of the second hemispherical shell. A first cylindrical cap is releasably engageable with the first connector to substantially enclose the elongate member. The first cylindrical cap has a hole through one end of the cap allowing the eyelet of the elongate member to extend through the hole of the cap end. A second cylindrical cap is substantially similar to the first cylindrical cap and is releasably engageable to the second connector. A tubular member is inserted through the first hole of the first hemispherical shell and the second hole of the second hemispherical shell. One end of the tubular member is inserted through the base portion opening of the first connector and securely attached within the inner cavity of the elongate member of the first connector and the other end of the tubular member is inserted through the base portion opening of the second connector and securely attached within the inner cavity of the elongate member of the second connector, thereby securedly attaching the first and second hemispherical shells together and allowing communication between the eyelets of the first and second connectors. At least one ring shaped weight is disposed around the elongate member of the first or second connector to submerge one half of the buoyant sphere beneath the surface of water, thereby standing the floatation ball in an upright position with the first and second cylindrical caps aligned generally perpendicular to the surface of the water.

BRIEF DESCRIPTION OF THE DRAWINGS

The present invention will be further explained with reference to the attached figures, wherein like structure is referred to by like numerals throughout the several views.

While the above-identified drawing figures set forth one preferred embodiment of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION

Figure 1:
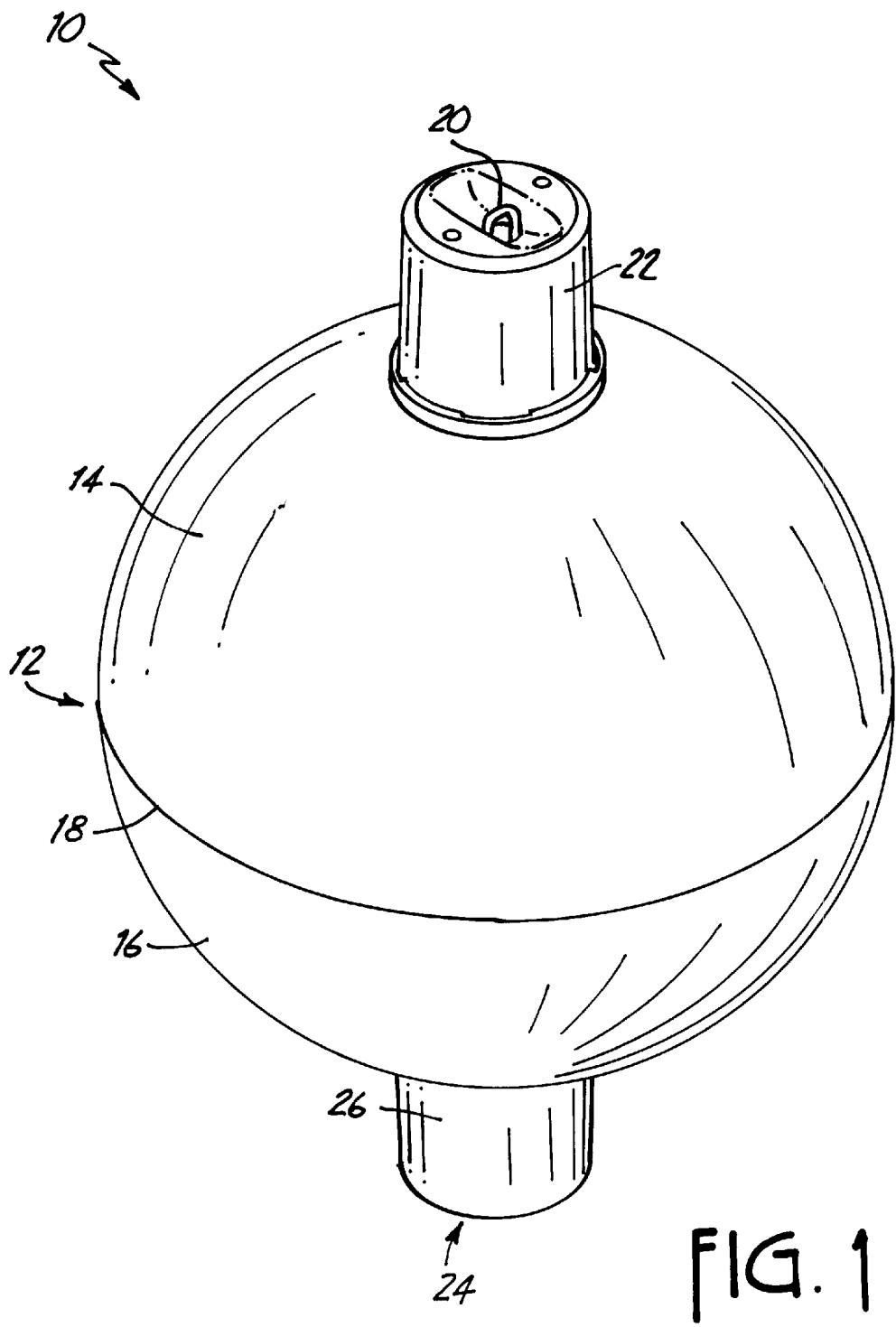
FIG. 1 is a perspective view of the reversible weighted vessel.

The present invention is a reversibly weighted floatation vessel shown at 10 in FIG. 1. The vessel 10 includes a floatation sphere or ball 12 comprising a first hemisphere 14 and a second hemisphere 16 joined at a seam 18. Floatation ball 12 is hollow, and the trapped air inside the floatation ball 12 provides buoyancy to the vessel 10. It is understood that floatation ball 12 can be constructed as a buoyant sphere consisting of one piece instead of having two hemispheres that are joined to form floatation ball 12. A first connector 20 is fixedly attached to one pole of the first hemisphere 14 and a first cylindrical cap 22 is releasably engageable with the first connector 20 to substantially enclose the first connector 20. Similarly, a second connector 24 is fixedly attached to the other pole of the second hemisphere 16 and a second cylindrical cap 26 is releasably engageable with the second connector 24 to substantially enclose the second connector 24. Weighted material is placed into one of the cylindrical caps, while the other cylindrical cap remains empty, and the reversible weighted floatation vessel 10 is placed into water submerging the weighted cylindrical cap beneath the surface of the water, thereby standing the vessel 10 upright in the water. To reverse the floatation orientation of the vessel 10, the cylindrical caps are removed, the weighted material is moved from one end to the other and then the caps are replaced.

Figure 2:
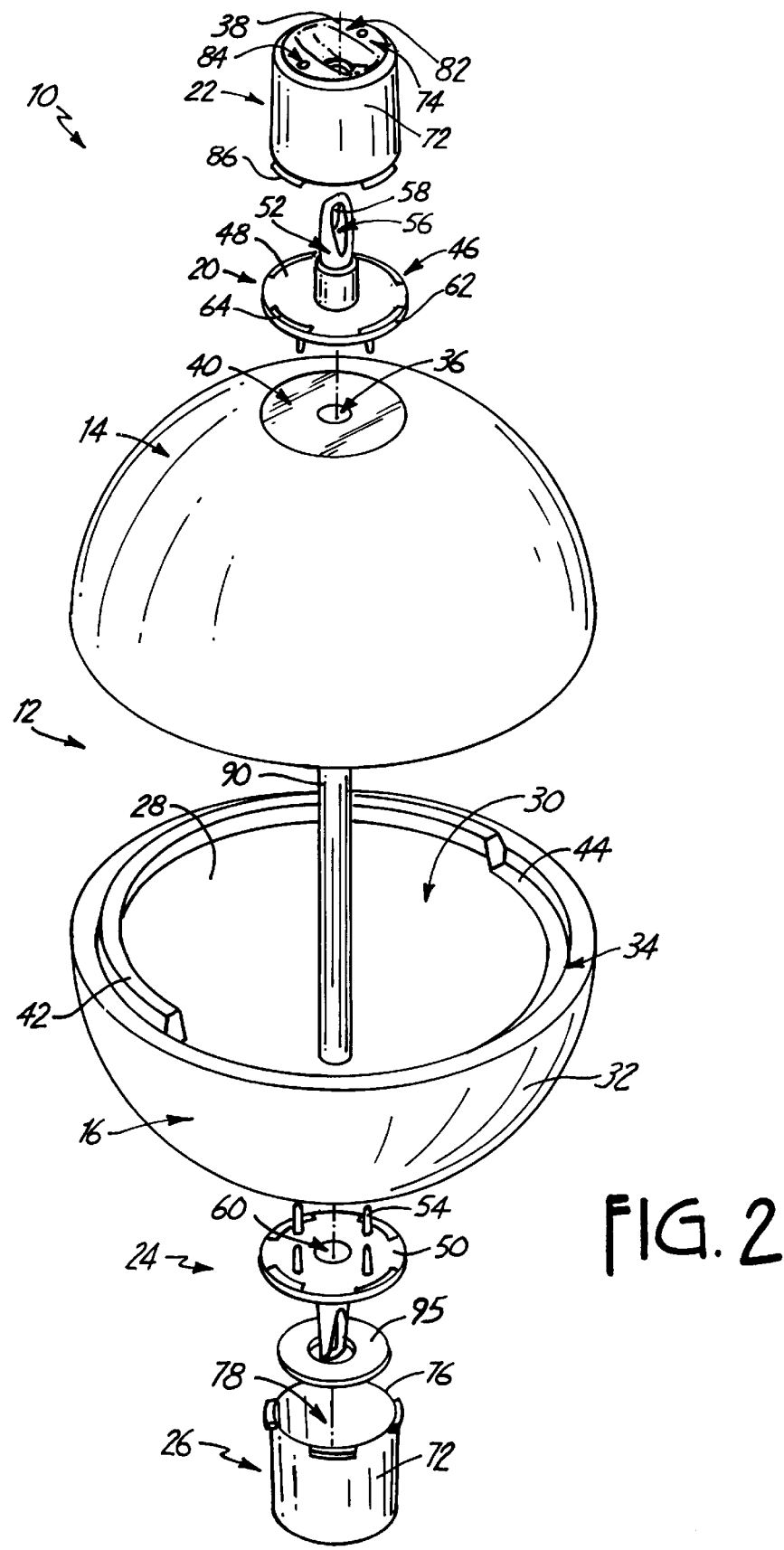
FIG. 2 is an exploded perspective view of the reversible weighted vessel along its polar axis.
Figure 3:
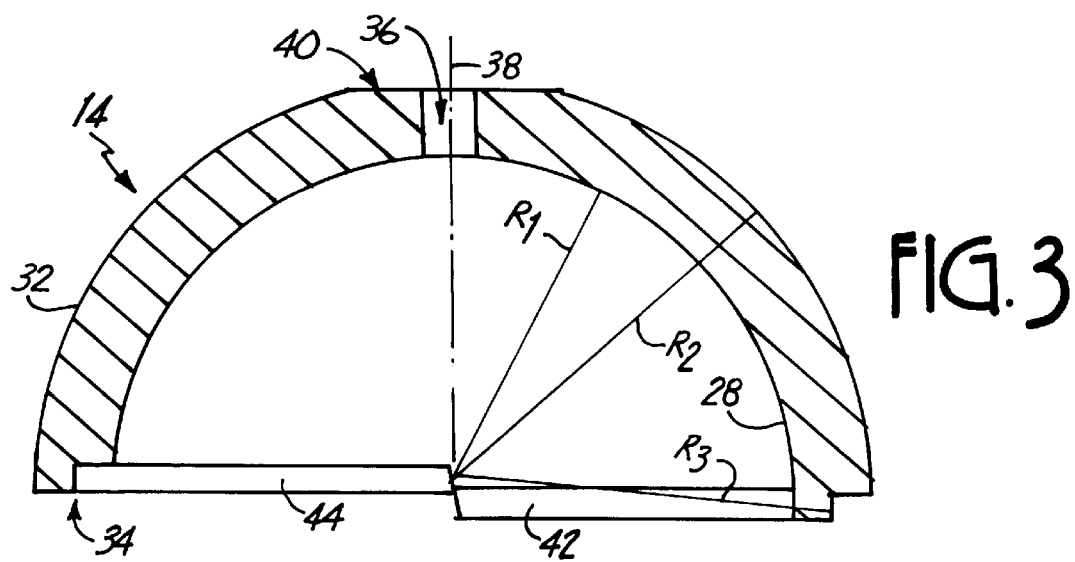
FIG. 3 is a cross-sectional view of the first hemispherical shell of the reversible weighted vessel.

In one preferred embodiment, as shown in FIG. 2, the first and second hemispheres are hemispherical shells 14, 16. The first hemispherical shell 14 is substantially the same as the second hemispherical shell 16 and thus reference to the first hemispherical shell 14 and its components is equivalent to a reference to the second hemispherical shell 16 and its components. The first hemispherical shell 14 has an inner surface 28 defining a cavity 30 therein, an outer surface 32, and a first edge 34. A first hole 36 extends from the inner surface 28 to the outer surface 32 along a polar axis 38. The outer surface 32 has a substantially flat first region 40 centered around the first hole 36. In this embodiment, the first hemispherical shell 14 has a semicircular raised lip 42 and a semicircular recess 44 about the first edge 34 of the first hemispherical shell 14. As shown in FIG. 3, the first hemispherical shell 14 has a first edge 34 with a thickness defined by an inner radius, $R_1$, and an outer radius, $R_2$. The semicircular raised lip 42 extending from the first edge 34, has a thickness defined by the first radius, $R_1$ and an intermediate radius, $R_3$. The semicircular recess 44 also has a thickness defined by the inner radius $R_1$ and an intermediate radius $R_3$.

The buoyant floatation ball 12 is formed by the first hemispherical shell 14 engaging the second hemispherical shell 16, whereby the first edge 34 of the first hemispherical shell 14 contacts the second edge of the second hemispherical shell 16 along the seal 18. In the preferred embodiment, the first and second hemispherical shells 14, 16 form the floatation ball 12 by frictional engagement between the first edge 34 of the first hemispherical shell 14 and the second edge of the second hemispherical shell 16. The raised lip 42 of the first hemispherical shell 14 engages the recess of the second hemispherical shell 16 and the lip of the second hemispherical shell 16 engages the recess 44 of the first hemispherical shell 14 thereby holding the first and second hemispherical shells 14, 16 together in frictional engagement. In one embodiment, the first and second edges are sealed together (using adhesives or the like) to hold the first and second hemispherical shells 14, 16 together to form the floatation ball 12.

Preferably, floatation ball 12 is made of a buoyant material relative to water such as Styrofoam® brand material, and the diameter of floatation ball 12 is approximately four times the diameter of the first or second cylindrical cap. In one embodiment, the floatation ball 12 has a diameter of approximately 8 inches. Also preferably, floatation ball 12 has either a round or geodesic surface with an orange peel finish and the outer surface 32 of the first and second hemispheres 14, 16 are visually distinctive from one another. In one embodiment, the outer surface 32 of the first and second hemispheres 14, 16 have indicia thereon. Further, the colors of the first cylindrical cap 22 and the second cylindrical cap 26 correspond to the colors of the second hemispherical shell 16 and the first hemispherical shell 14, respectively or the colors of the first and second cylindrical caps 22, 26 correspond with the colors of the first hemispherical shell 14 and second hemispherical shell 16, respectively. Preferably, the first and second cylindrical caps 22, 26 have a smooth finish with high gloss enamel coloring and are visually distinctive from one another. The reversible color combinations between the cylindrical caps and the hemispheres of the floatation ball 12 allow the reversible weighted floatation vessel 10 to be used as a marker buoy or mooring buoy, and also extend the life of the vessel 10 by allowing flexibility to vary the amount of time each hemisphere is exposed to the particular elements of the sun or the water.

Figure 4A:
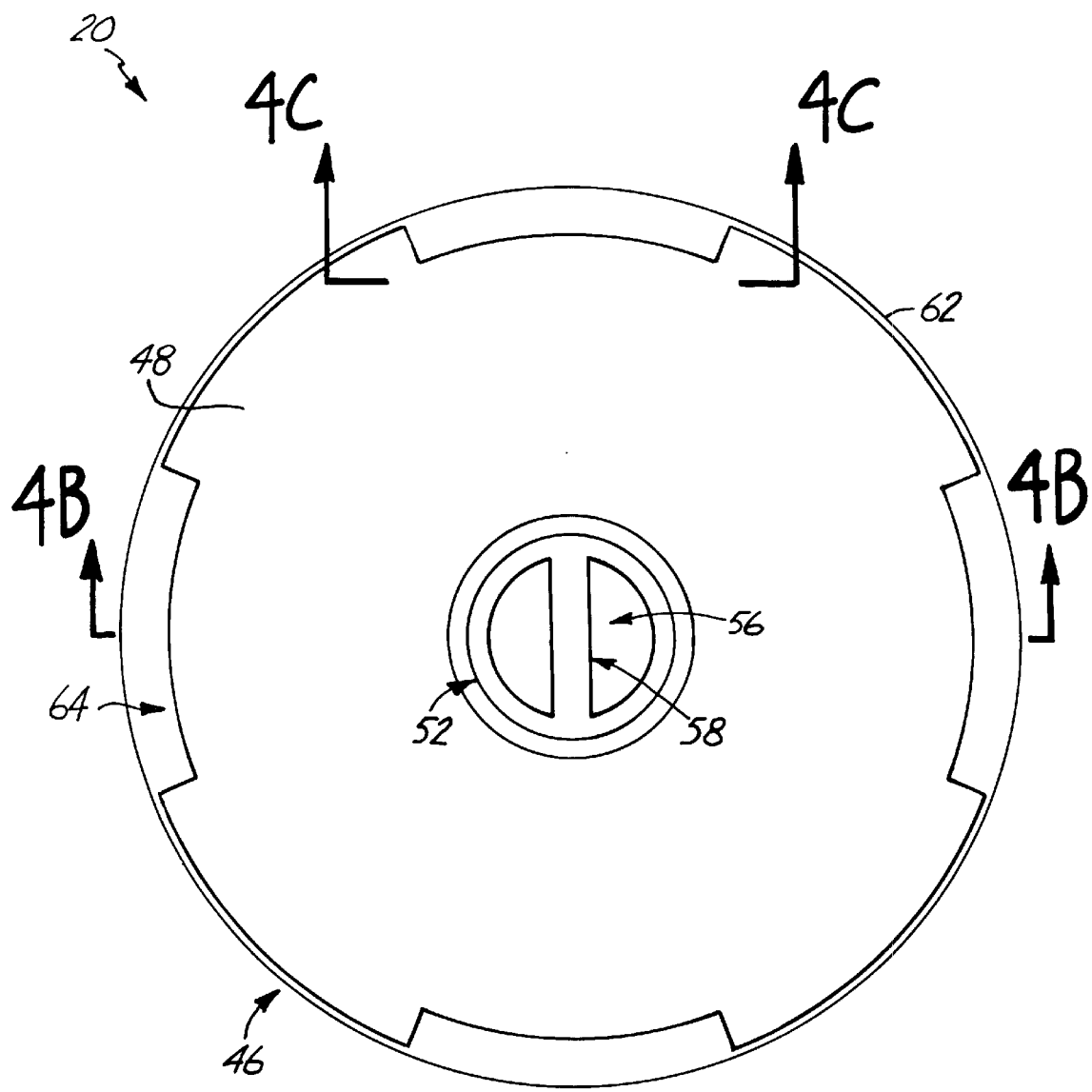
FIG. 4A is a top view of the first connector of the reversible weighted vessel.
Figure 4B:
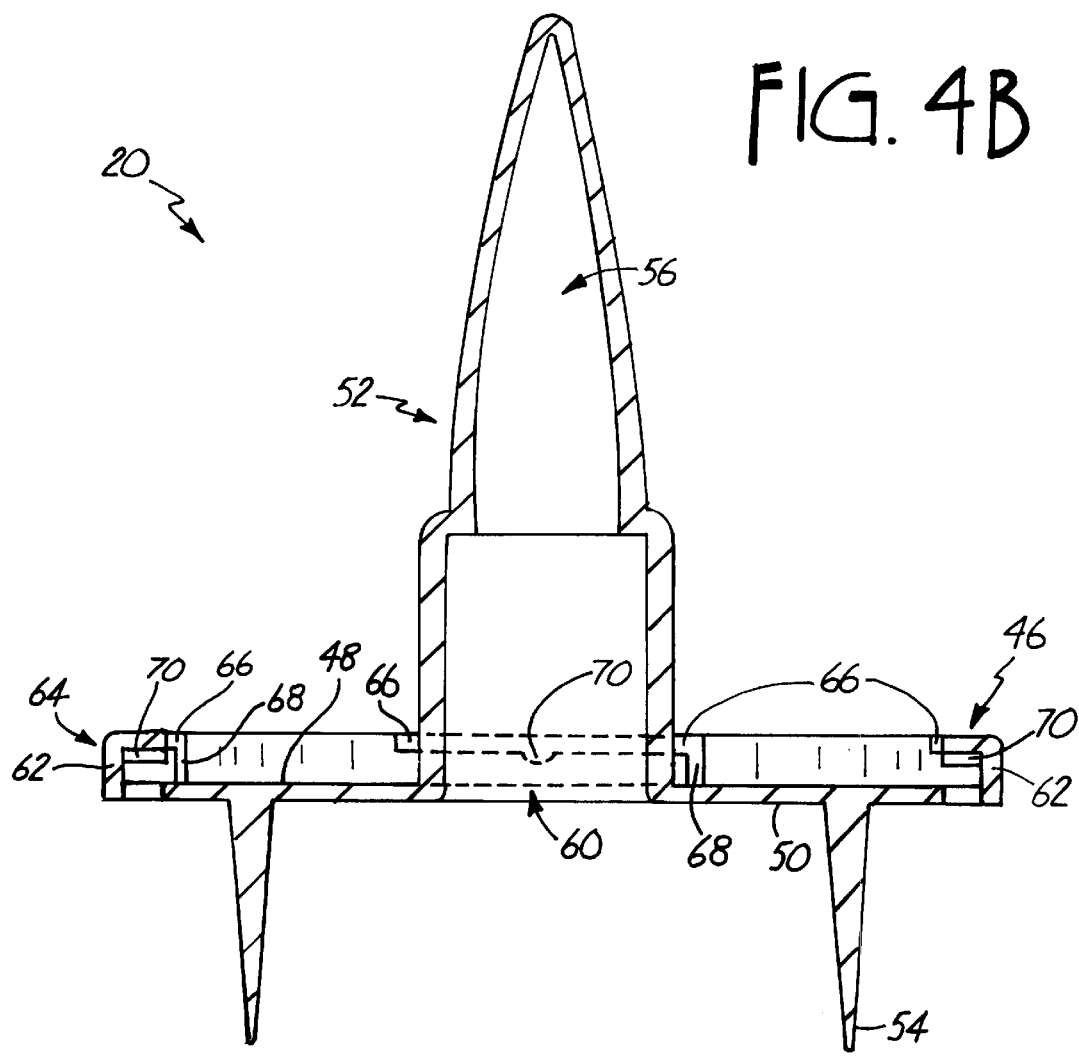
FIG. 4B is a cross-sectional view of the first connector taken along lines 4B—4B
Figure 4C:
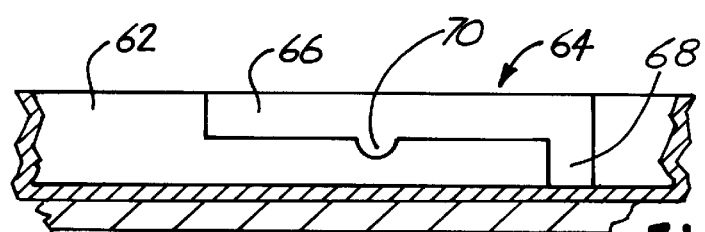
FIG. 4C is a cross-sectional view of the locking flange taken along lines 4C—4C.

In the embodiment, shown in FIG. 2, the first connector 20 is substantially the same as the second connector 24 and thus reference to the first connector 20 and its components is equivalent to a reference to the second connector 24 and its components. The first connector 20 has a substantially flat base portion 46 with a first surface 48 and second surface 50, whereby an elongate member 52 extends from the first surface 48 as shown in FIG. 2. The base portion 46, preferably has a plurality of protrusions 54 extending from the second surface 50 for insertion into the first region 40 of the first hemispherical shell 14. Insertion of the protrusions 54 into the first region 40 allows the second surface 50 of the base portion 46 to contact the first region 40 and also anchors the first connector 20 to the first hemispherical shell 14, thereby preventing angular rotation of the first connector 20 relative to the first hemispherical shell 14. The first connector 20 can also be fixed to the first region 40 with an adhesive, screw, rivet, or any of a number of known fasteners. Alternatively, the first connector 20 can be integrally molded as part of the first hemispherical shell 14. The elongate member 52 has an inner cavity 56 and an eyelet 58 on the distal end of the elongate member 52 providing access to the inner cavity 56. The second surface 50 of the base portion 46 has an opening 60 to the inner cavity 56 of the elongate member 52. Preferably upon insertion of the protrusions 54 into the first region 40, the base portion opening 60 is aligned with the first hole 36 of the first hemispherical shell 14. In the preferred embodiment, as shown in FIGS. 2 and 4A, the first surface 48 of the base portion 46 has a raised annular ring 62 about the circumference of the base portion 46. As seen in FIG. 4B, a plurality of locking flanges 64 extend perpendicularly from the annular ring 62 toward the elongate member 52 defining an overhang 66 above the first surface 48, a side support 68 extending along the first surface 48, and a locking protrusion 70 under the overhang 66. The locking flanges 64 are for releasably engaging the first cylindrical cap 22 to the first connector 20 to define a bayonet mount apparatus.

Figure 5A:
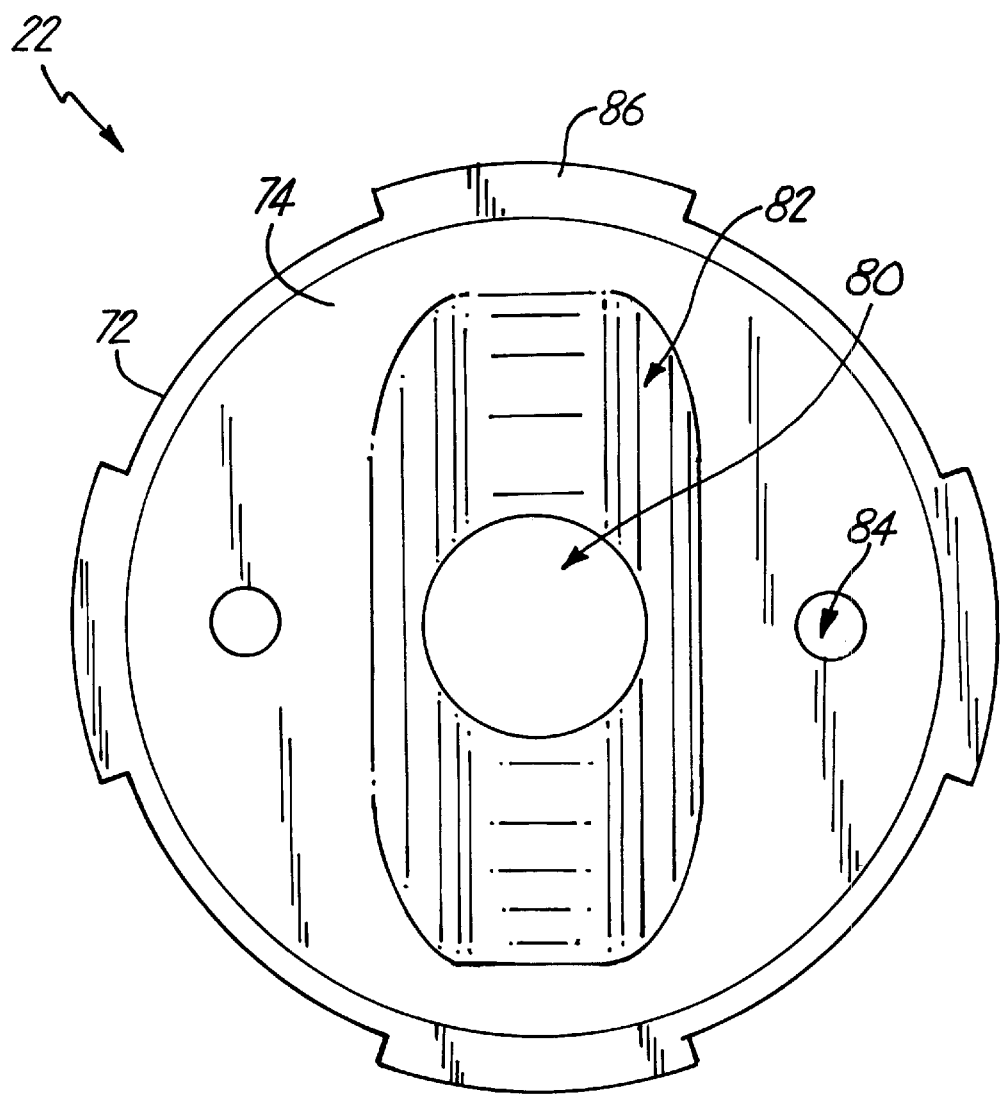
FIG. 5A is a top view of the first cylindrical cap.
Figure 5B:
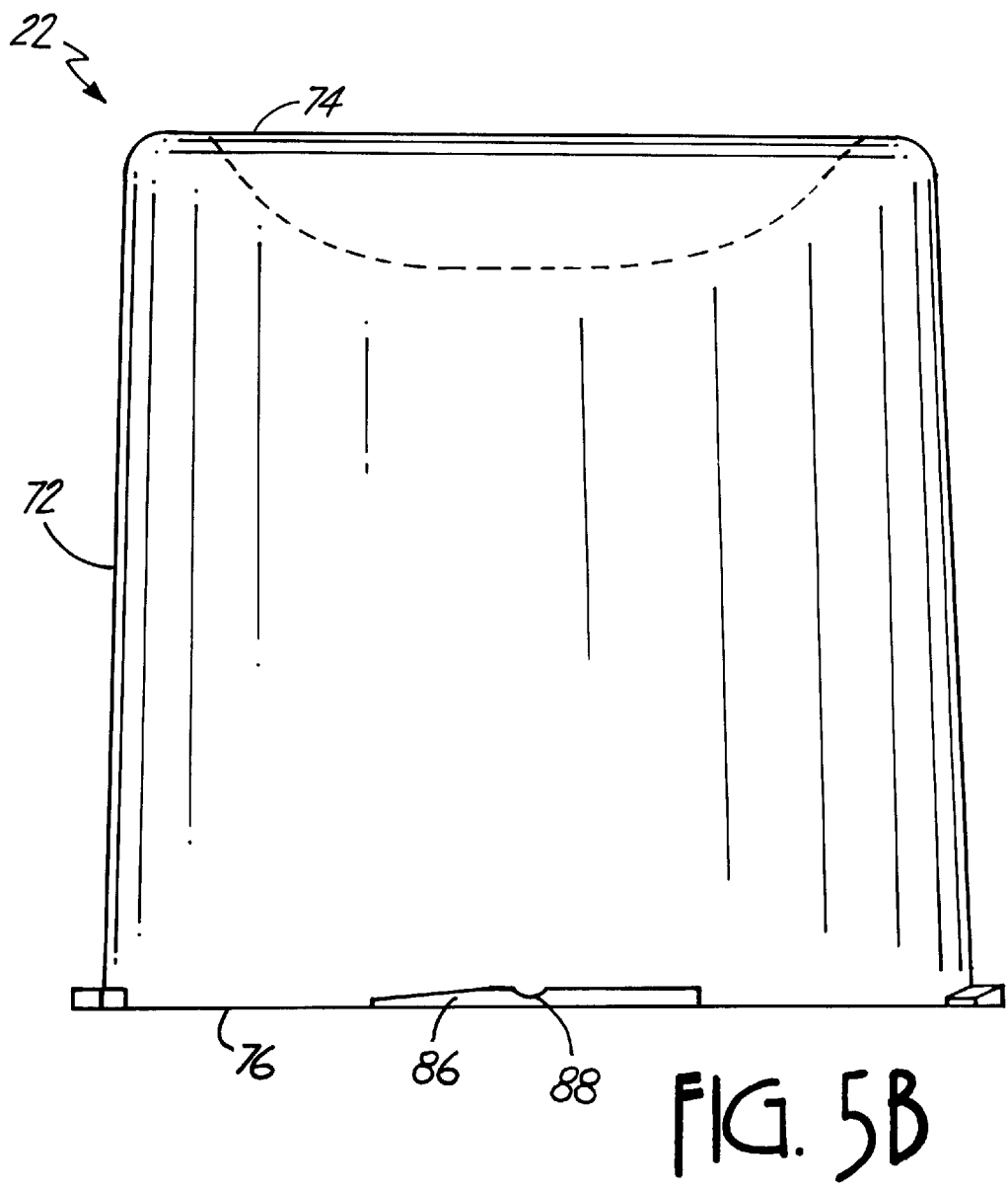
FIG. 5B is a side view of the first cylindrical cap.

In one embodiment, as shown in FIG. 2, the first cylindrical cap 22 is substantially the same as the second cylindrical cap 26 and thus reference to the first cylindrical cap 22 and its components is equivalent to a reference to the second cylindrical cap 26 and its components. The first cylindrical cap 22 includes a cylindrical wall 72 and a cap end 74 defining an opening 76 to a cavity 78 therein, as shown in FIG. 2. The first cylindrical cap 22 is releasably engageable with the first connector 20 thereby substantially enclosing the elongate member 52 within the cavity 78 of the first cylindrical cap 22. As shown in FIG. 5A, the first cylindrical cap 22 has a hole 80 through the cap end 74. The hole 80 in the cap end 74 enables the eyelet 58 of the elongate member 52 of the first connector 20 to extend through the hole 80. In the preferred embodiment as shown in FIGS. 2, 5A and 5B, the first cylindrical cap 22 has a recess 82 in the cap end, whereby the recess 82 is centered around the hole 80 in the cap end 74. Preferably, the elongate member 52 extends through the hole 80 in the cap end 74 such that the distal ends of the elongate member 52 is substantially planar with the cap end 74. The recess 82 of the first cylindrical cap 22 allows an attachment line, such as fishing line, to be coupled to the eyelet 58 of the first connector 20. Even more preferably, as shown in FIG. 5A, the cap end 74 has a plurality of holes 84 therethrough to permit, the drainage of water.

In the preferred embodiment as shown in FIGS. 2 and 5A, the first cylindrical cap 22 has a plurality of segmented flanges 86 about the opening 76 to the cavity 78 extending outwardly therefrom. The segmented flanges 86 correspond to the locking flanges 64 of the first connector 20. As shown in FIG. 5B, the segmented flanges 86 have a locking dimple 88 to engage the locking protrusion 70 of the first connector 20. Thus, the first cylindrical cap 22 is placed on the first connector 20 and the first cylindrical cap 22 is partially rotated so that the segmented flanges 86 slide underneath the overhangs 66 until the segmented flanges 86 contact the side supports 68 and the locking protrusions 70 engages the locking dimples 88, thereby locking the first cylindrical cap 22 to the first connector 20.

Figure 6:
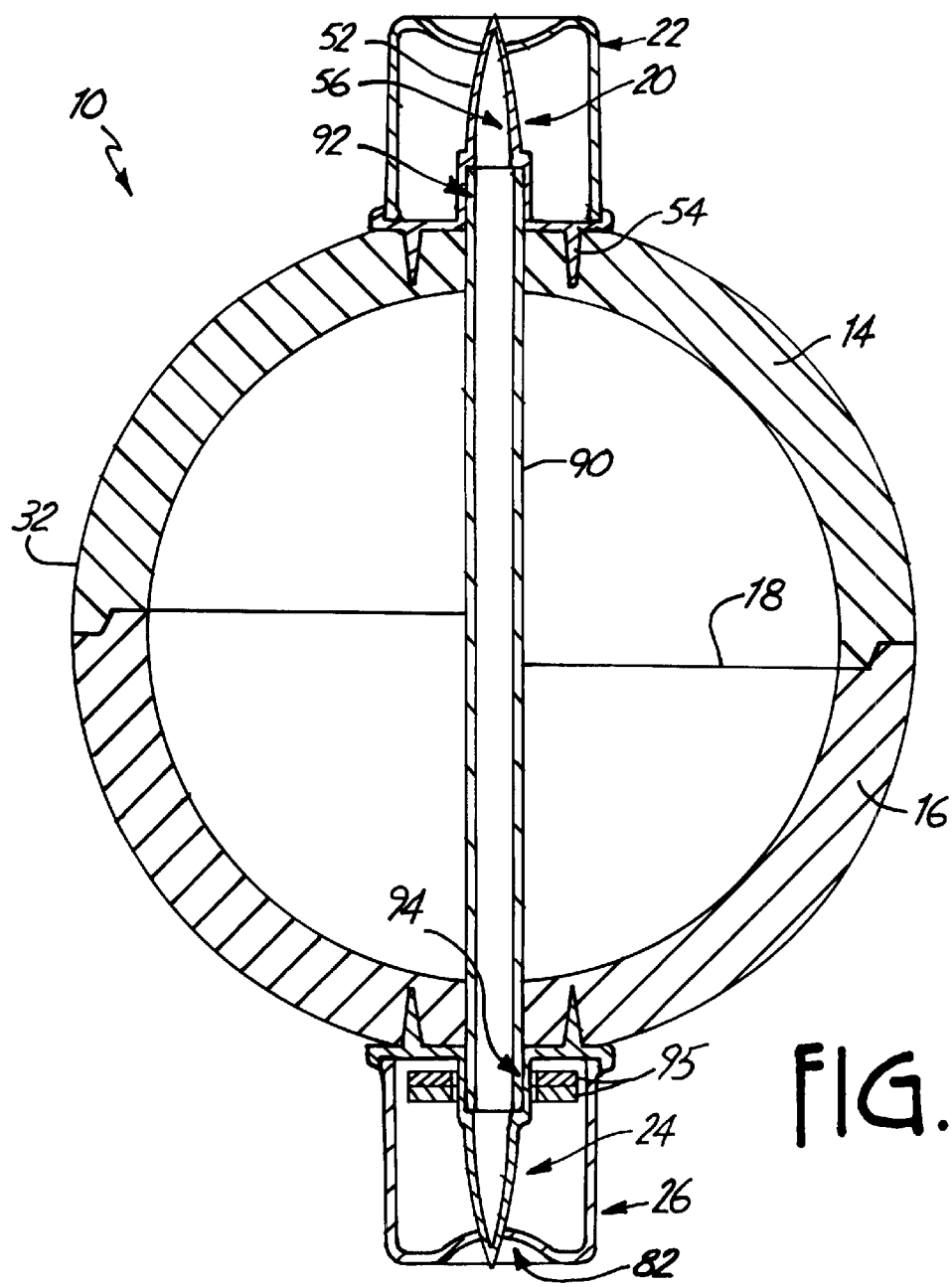
FIG. 6 is a cross-sectional view of the reversible weighted vessel.

In one preferred embodiment, a tubular member 90, as shown in FIG. 2, is included to hold the first and second hemispherical shells 14, 16 together to form the floatation ball 12. As shown in FIG. 6, the tubular member has one end 92 inserted through the first hole 36 of the first hemispherical shell 14 and the other end 94 is inserted through the second hole of the second hemispherical shell 16. Additionally, as seen in FIG. 6, one end 92 of the tubular member 90 is inserted into the base portion opening 60 of the first connector 20 and is securely attached within the inner cavity 56 of the elongate member 52 and the other end 94 of the tubular member is inserted through the base portion opening of the second connector 24 and is also securely attached within the inner cavity of the elongate member. With the tubular member 90 connected at both ends to the first and second connectors 20, 24, the tubular member securely attaches the first and second hemispherical shells 14, 16 together and maintains the spherical shape of the floatation ball 12. Additionally, a fastener such as a belt or cable can be used inside or outside floatation ball 12 for additional strength to keep first and second hemispheres together.

Weighted material 95 is placed into one of the cylindrical caps, while the other cylindrical cap remains empty, and the reversible weighted floatation vessel 10 is placed into the water. To reverse, the cylindrical caps are removed, the empty cap is filled with the weighted material 95, and the other cap is emptied of weighted material 95. The weighted material 95 placed in one cap causes the vessel 10 to stand in an upright position with the caps in generally perpendicular alignment to the water's surface. If, for example, the weighted material 95 is placed in the first cylindrical cap 22 then the first cylindrical cap 22 is submerged beneath the surface of the water while the second cylindrical cap 26 is aligned generally perpendicular to the surface of the water. The vessel 10 is unrestricted in size relative to the fish sought and maintains an upright position independent of the depth of the water. The ability to stand upright is especially beneficial during inclement weather when the bobber or buoy is more difficult to see. A suitable amount of weighted material 95 relative to the size and buoyancy of floatation ball 12 will make reversible weighted vessel 10 stable in the upright position. The degree to which weighted reversible floatation vessel 10 will sit above the surface of the water can be adjusted by varying the amount of weighted material 95 placed in a cylindrical cap. The weighted material 95 can be sand, water, rocks or any other substance of sufficient density. In one embodiment, the weighted material 95 is a ring shaped weight placed around the elongate member 52 of the first or second connectors 20, 24. Additional ring shaped weights can be added around the elongate member 52 to increase the depth the floatation vessel is submerged. Thus, the operator can choose which hemispherical shell to submerge and which hemispherical shell to expose on the surface of the water as well as choose the depth the floatation vessel is submerged.

Attachment of lines to the cylindrical caps and the reversible nature of the float allow the device to be used as a fishing bobber, marker buoy, anchor buoy, mooring buoy or decorative ornament. In one embodiment of the vessel 10 as a fishing bobber, fishing line can be attached to the eyelet 58 of the first connector 20 while a separate piece of fishing line is attached to the eyelet of the second connector 24. In another embodiment of the vessel as a fishing bobber, fishing line can be attached to either the first or second connectors 20, 24. In another embodiment of the vessel as a fishing bobber, fishing line is inserted into the eyelet of one of the connectors and through the tubular member and out the eyelet of the other connector. In this embodiment, the depth of the bait at the end of the fishing line can be adjusted without removing the bobber from the water.

Figure 7:
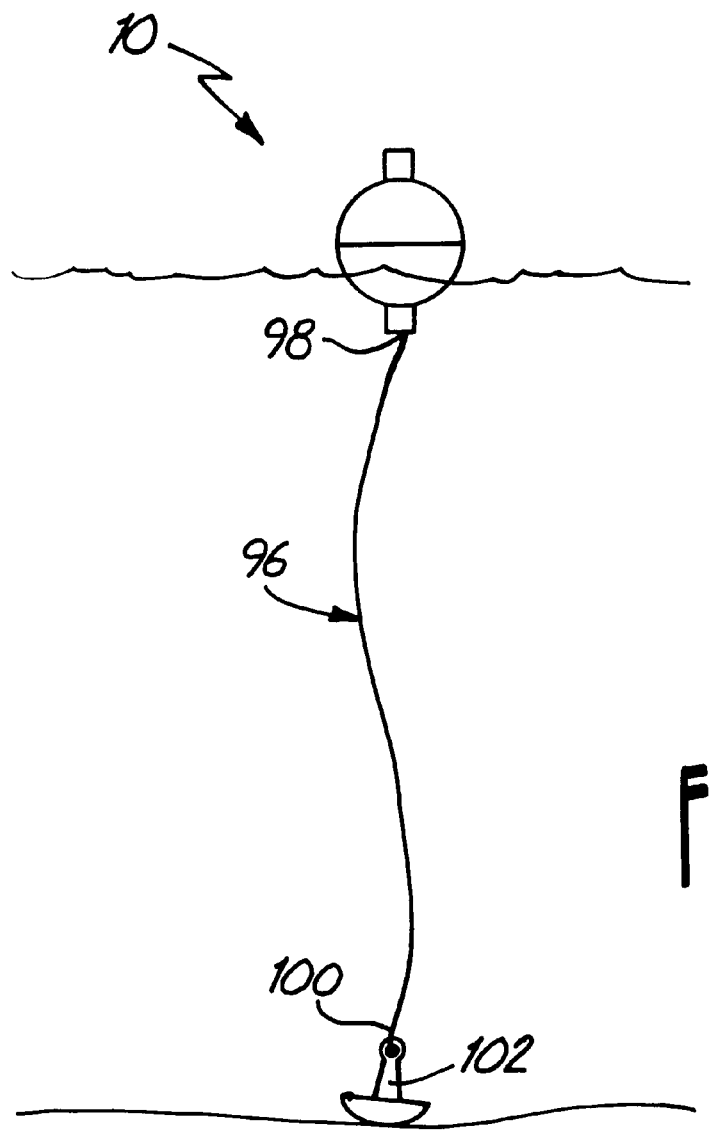
FIG. 7 is a schematic drawing showing the vessel as a marker buoy.
Figure 8:
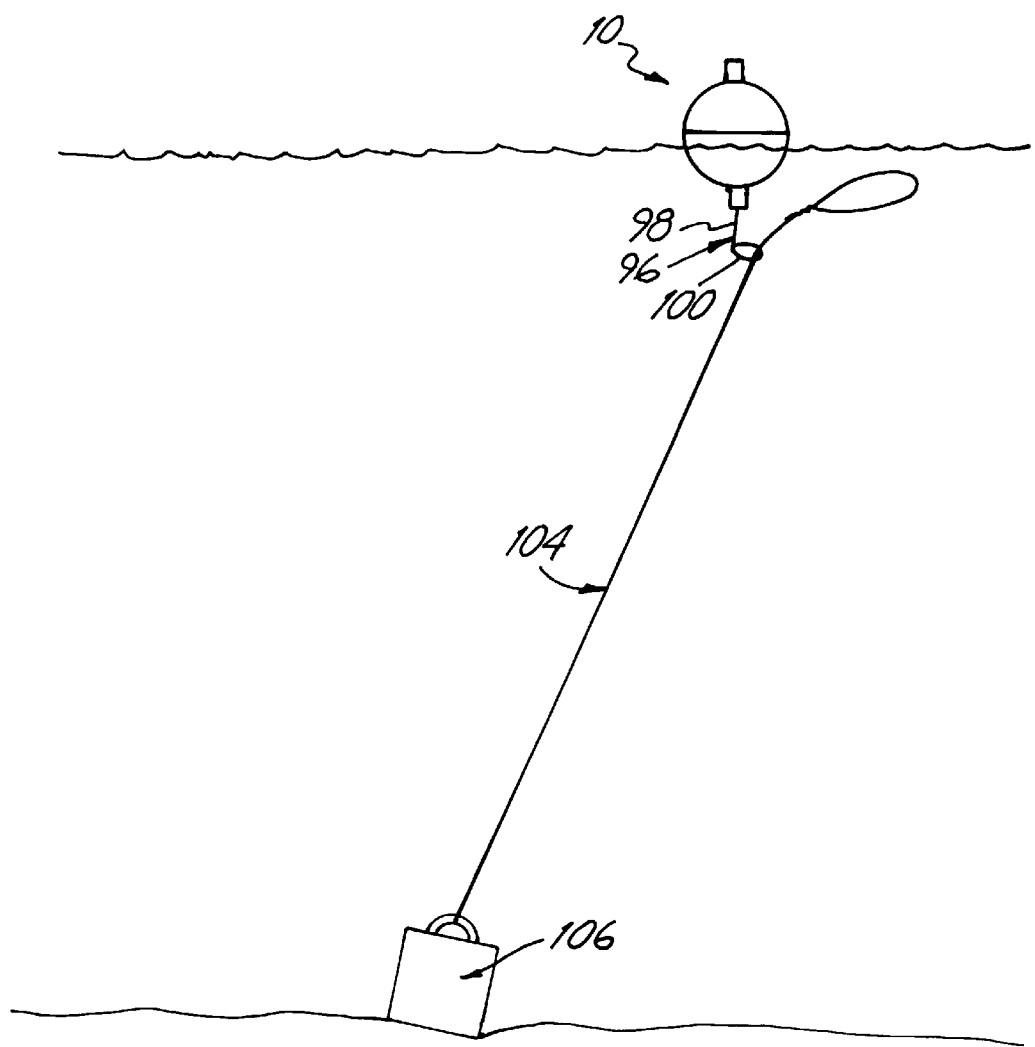
FIG. 8 is a schematic drawing showing the vessel as a mooring buoy.

In another embodiment, the reversibly weighted floatation vessel 10 can be used as a marker buoy as shown in FIG. 7. In this embodiment, weighted material 95 is placed in either the first or second cylindrical cap 22, 26, thereby submerging the selected cylindrical cap. The submerged connector is then secured to an attachment line 96, such as cable or rope, where one end 98 of the attachment line 96 is secured to the submerged connector and the other end 100 of the attachment line 96 is secured to a fixed point or anchor weight 102 below the surface of water. Alternatively, one end 98 of the attachment line 96 is fastened to the submerged connector and the other end 100 of the attachment line 96 is slidably attached to a second attachment line 104, whereby the second attachment line 104 is fixedly attached to a stationary point or anchor weight 106. Thus, the reversibly weighted floatation vessel 10 would operate as a mooring buoy, as shown in FIG. 8.

Figure 9:
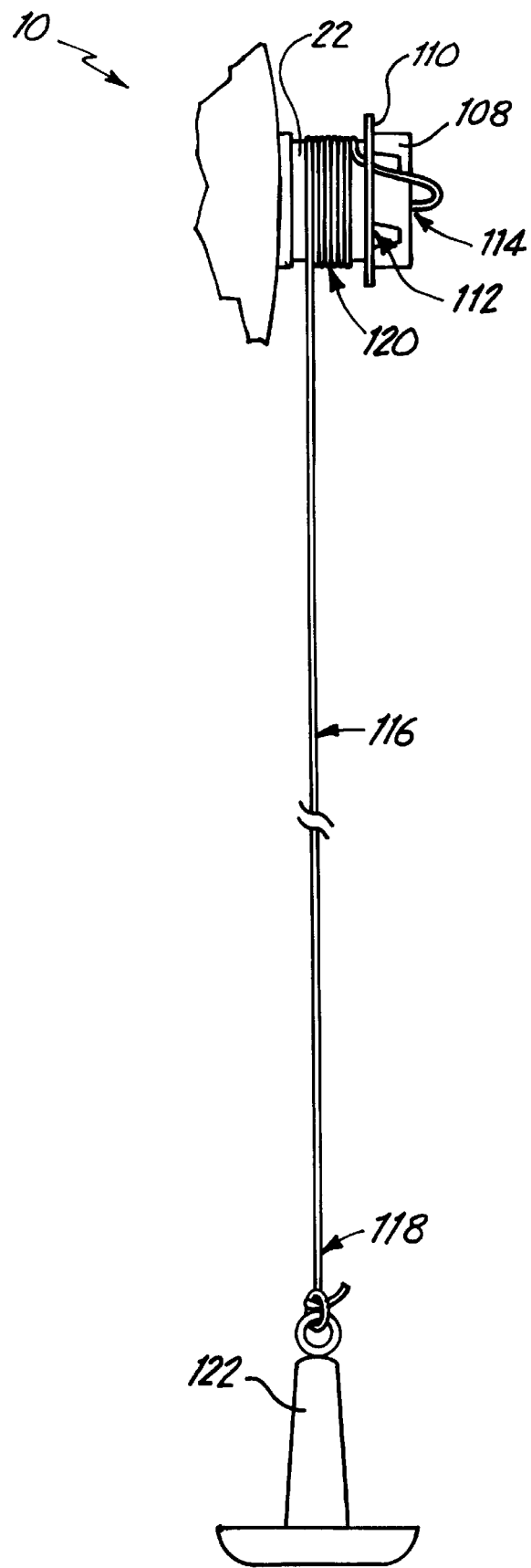
FIG. 9 is a schematic drawing showing the vessel with a flange for use as a marking buoy with an anchor weight retrieving capabilities.

In yet another embodiment, the reversibly weighted floatation vessel 10 can be used as a marking buoy with anchor weight retrieving capabilities. As shown in FIG. 9, a flange 108 may be releasably attached to either the first or second cylindrical cap 22, 26. The flange 108 has an annular collar 110 with at least one hole 112 therethrough. In use, a first end 114 of an attachment line 116 is attached to the eyelet of the connector with the flange 108 located thereon. The second end 118 of the attachment line 116 is inserted through the hole 112 in the collar 110 of the flange 108 and is wound around the first cylindrical cap 22 creating a spool of attachment line 120. An anchor weight 122 is fastened to the second end 118 of the attachment line 116. The vessel 10 is then rotated to either unwind the attachment line 116 and extend the anchor weight 122 below the surface of the water or the vessel 10 is rotated in the opposite direction to wind the attachment line 116 into a spool 120 thus retrieving the anchor weight 122.

The reversibly weighted floatation vessel offers the advantage of allowing the user to choose which hemisphere of the vessel to submerge and which to expose as well as how deep to submerge the vessel. In addition, placement of weight in one cylindrical cap offers the advantage of causing the vessel to stand in an upright position with the opposite cylindrical cap in generally perpendicular alignment to the water's surface, thereby increasing visibility of the vessel. Attachment of lines to the vessel and the reversible nature of the float allow the device to be used as a fishing bobber, marker buoy, anchor buoy or decorative ornament.

What is claimed is:

1. A reversibly weighted floatation vessel comprising:
   a buoyant sphere;
   a hollow member extending through the sphere along a first axis;
   a first cover releasably affixed to the sphere and substantially enclosing one end of the hollow member, the first cover having an opening allowing the end of the hollow member to extend therethrough;
   a second cover releasably affixed to the sphere and substantially enclosing the other end of the hollow member, the second cover having an opening allowing the other end of the hollow member to extend therethrough; and
   at least one weight selectively contained within either the first or second cover to define a floatation orientation for the buoyant sphere.

2. The reversibly weighted floatation vessel of claim 1, wherein the buoyant sphere has at least two hemispheres and the hemispheres are visually distinct from each other.

3. The reversibly weighted floatation vessel of claim 1, wherein the buoyant sphere has indicia thereon.

4. The reversibly weighted floatation vessel of claim 1, wherein each of the covers is affixed to the sphere by a bayonet mount apparatus.

5. The reversibly weighted floatation vessel of claim 4, wherein the bayonet mount apparatus for each cover comprise:

a connector having a circular base portion, the base portion having a first and second surface, the second surface being in contact with the sphere, the connector having a raised annular ring about the circumference of the base portion on the first surface, a plurality of locking flanges extending perpendicularly from the ring radially inwardly to define an overhang above the first surface and a side support extending along the first surface; and
   wherein each cover has a cylindrical wall and a cap end defining an opening to a cavity for substantially enclosing the connector therein, the cover having a plurality of segmented flanges about the opening to the cavity extending radially outwardly therefrom, the segmented flanges slidable underneath the overhang by partial rotation of the cover until the segmented flanges contact the side supports.

6. The reversibly weighted floatation vessel of claim 5, wherein at least one of the locking flanges and segmented flanges has on opposed releasably engaging locking protrusion and locking dimple.

7. A reversibly weighted floatation ball comprising:
   a first hemisphere having a first hole therethrough along a polar axis;
   a second hemisphere having a second hole therethrough along the polar axis, the second hemisphere engageable with the first hemisphere to form a buoyant sphere;
   a first connector having a base portion with a first surface and a second surface, the second surface being fixedly attached to the first hemisphere, an elongate member extending from the first surface, the elongate member having an inner cavity and an eyelet on a distal end of the elongate member providing access to the inner cavity through the eyelet, the second surface of the base portion having an opening to the inner cavity of the elongate member;
   a first cover releasably engageable with the first connector to substantially enclose the elongate member, the first cover having a hole allowing the eyelet of the elongate member to extend therethrough;
   a second connector having a base portion with a first surface and a second surface, the second surface being fixedly attached to the second hemisphere, an elongate member extending from the first surface, the elongate member having an inner cavity and an eyelet on a distal end of the elongate member providing access to the inner cavity through the eyelet, the second surface of the base portion having an opening to the inner cavity of the elongate member;
   a second cover releasably engageable with the second connector to substantially enclose the elongate member, the second cover having a hole allowing the eyelet of the elongate member to extend therethrough;
   a tubular member with one end extending through the first hole of the first hemispherical shell and the opening to the base portion of the first connector and the other end of the tubular member extending through the second hole of the second hemispherical shell and the opening of the base portion of the second connector allowing communication between the eyelets of the first and second connectors; and
   at least one weight selectively placed within either the first or second cover causing the cover with the weight to be submerged below the surface of water, thereby defining a floatation orientation for the floatation ball.

8. The reversibly weighted floatation ball of claim 7, wherein the first and second hemispheres are visually distinct from each other.

9. The reversibly weighted floatation ball of claim 7, wherein the buoyant sphere has indicia thereon.

10. The reversibly weighted floatation ball of claim 7 wherein each of the covers is engaged to its respective connector by bayonet mount apparatus.

11. The reversibly weighted floatation ball of claim 10, wherein the base portion of each of the first and second connectors is circular and the first and second cover each include a cylindrical wall and a cap end defining an opening to a cavity for substantially enclosing the elongate member therein, and wherein the bayonet mount apparatus for each cover comprises:

a raised annular ring about the circumference of the base portion on the first surface of each connector;
   a plurality of locking flanges extending perpendicularly from the annular ring toward the elongate member defining an overhang above the first surface and a side support extending along the first surface; and
   a plurality of segmented flanges on each cover, the segmented flanges extending outwardly about the opening to the cavity of the cover, and being slidable underneath the overhang by partial rotation of the cylindrical wall until each flange contacts the side support.

12. The reversibly weighted floatation ball of claim 11, wherein at least one of the locking flanges and segmented flanges has an opposed, releasably engaging locking protrusion and locking dimple.

13. The reversibly weighted floatation ball of claim 7, wherein one end of an attachment line is fastened to the eyelet of either the first or second connector and the other end of the attachment line is secured to a fixed point below the surface of water such that the ball acts like a marker buoy.

14. The reversibly weighted floatation ball of claim 7, wherein one end of a first attachment line is fastened to the eyelet of either the first or second connector and the other end of the first attachment line is slidably attached to a second attachment line, whereby the second attachment line is fixedly attached to a stationary point, such that the ball acts like a mooring buoy.

15. The reversibly weighted floatation ball of claim 7, wherein a flange having an annular collar is releasably attached to either the first or second cover, the annular collar having at least one hole therethrough, whereby one end of an attachment line is fastened to the respective cover with the attached flange, and the other end of the attachment line is inserted through the hole in the annular collar and whereby the attachment line is wound around the cover with the flange to create a spool of attachment line around the cover.

16. A method for converting a floatation ball into a marking buoy with anchor weight retrieving capabilities, the floatation ball being spherical in shape and having first and second attachment poles at opposite poles of the floatation ball, the method comprising:

releasably attaching a flange to the first attachment pole, the flange having an annular collar, the annular collar having at least one hole therethrough;
   attaching a first end of an attachment line to the first attachment pole with the flange;
   inserting a second end of the attachment line through the hole in the collar of the flange;
   winding the attachment line around the first attachment pole to form a spool of attachment line;
   fastening an anchor weight to the second end of the attachment line; and
   rotating the ball to either unwind the attachment line and extend the anchor weight below the surface of water or wind the attachment line and retrieve the anchor weight.

17. A reversibly weighted ball for floating in water comprising:

a first hemispherical shell having an inner surface defining a cavity and an outer surface, a first hole extending from the inner surface to the outer surface along a polar axis, the outer surface having a substantially flat first region centered around the first hole;
   a second hemispherical shell having an inner surface defining a cavity and an outer surface, a second hole extending from the inner surface to the outer surface along the polar axis, the outer surface having a substantially flat second region centered around the second hole, the second hemispherical shell engageable with the first hemispherical shell to form a buoyant sphere;
   a first connector having a substantially flat base portion, the base portion having a first and second surface, an elongate member extending from the first surface, the elongate member having an inner cavity and an eyelet on the distal end of the elongate member providing access to the inner cavity, the base portion having a plurality of protrusions extending from the second surface for insertion into the first region of the first hemispherical shell allowing the second surface of the base portion to contact the first region and preventing angular rotation of the first connector relative to the first hemispherical shell, the second surface of the base portion having a opening to the inner cavity of the elongate member, the base portion opening being aligned with the first hole of the first hemispherical shell;
   a first cylindrical cap releasably engageable with the first connector to substantially enclose the elongate member, the first cylindrical cap having a hole through one end of the cap allowing the eyelet of the elongate member to extend through the hole of the cap end;
   a second connector having a substantially flat base portion, the base portion having a first and second surface, an elongate member extending from the first surface, the elongate member having an inner cavity and an eyelet on the distal end of the elongate member providing access to the inner cavity, the base portion having a plurality of protrusions extending from the second surface for insertion into the second region of the second hemispherical shell allowing the second surface of the base portion to contact the second region and preventing angular rotation of the second connector relative to the second hemispherical shell, the second surface of the base portion having a opening to the inner cavity of the elongate member, the base portion opening being aligned with the second hole of the second hemispherical shell;
   a second cylindrical cap releasably engageable with the second connector to substantially enclose the elongate member, the second cylindrical cap having a hole through one end of the cap allowing the eyelet of the elongate member to extend through the hole of the cap end;
   a tubular member for insertion through the first hole of the first hemispherical shell and the second hole of the second hemispherical shell, one end of the tubular member being inserted through the base portion opening of the first connector and securely attached within the inner cavity of the elongate member of the first connector and the other end of the tubular member being inserted through the base portion opening of the second connector and securely attached within the inner cavity of the elongate member of the second connector, thereby securedly attaching the first and second hemispherical shells together and allowing communication between the eyelets of the first and second connectors; and at least one ring shaped weight disposed around the elongate member of the first or second connector to submerge the connector with the ring shaped weight beneath the surface of water, thereby standing the floatation ball in an upright position with the first and second cylindrical caps aligned generally perpendicular to the surface of the water.

18. The reversibly weighted ball of claim 17, wherein each of the caps is engaged to its respective connector by a bayonet mount apparatus.

19. The reversibly weighted ball of claim 17, wherein the base portion of each of the connectors is circular and each cap includes a cylindrical wall and a cap end defining an opening to a cavity for substantially enclosing the elongate member therein, and wherein the bayonet mount apparatus for each cover comprises:

a raised annular ring about the circumference of the base portion on the first surface of each connector;

a plurality of locking flanges extending perpendicularly from the annular ring toward the elongate member defining an overhang above the first surface and a side support extending along the first surface; and a plurality of segmented flanges on each cover, the segmented flanges extending outwardly about the opening to the cavity of the cover, and being slidable underneath the overhang by partial rotation of the cylindrical wall until each flange contacts the side support.

20. The reversibly weighted ball according to claim 17, wherein at least one of the locking flanges and segmented flanges has an opposed, releasably engaging locking protrusion and locking dimple.

21. The reversibly weighted ball according to claim 17, wherein the first and second cylindrical caps each have a recess in their respective cap ends, wherein each recess is centered around the hole in the cap end.

22. The reversibly weighted ball according to claim 21, wherein the elongate members of the first and second connectors each extend through the hole in each cap end of the first and second covers such that the distal ends of the elongate members are substantially planar with the cap ends and the recesses of the first and second caps allow an attachment line to be coupled to the eyelets of the first and second connectors.

23. The reversibly weighted ball according to claim 17, wherein each cap end of the first and second cylindrical caps have a plurality of holes therethrough.

24. The reversibly weighted ball according to claim 17, wherein the first and second hemispherical shells are made of a buoyant material relative to water.

25. The reversibly weighted ball according to claim 17, wherein the outer surface of the first hemispherical shell is visually distinct from the outer surface of the second hemispherical shell.

26. The reversibly weighted ball according to claim 17, wherein the outer surface has indicia thereon.

* * * * *